3,171,814
PREPARATION OF DRY LITHIUM HYPO-CHLORITE COMPOSITIONS

Gerald J. Orazem, Reuben B. Ellestad, and Joseph R. Nelli, all of Gastonia, N.C., assignors to Lithium Corporation of America, Inc., New York, N.Y., a corporation of Minnesota
No Drawing. Filed Feb. 20, 1962, Ser. No. 174,380
4 Claims. (Cl. 252—187)

This invention relates to improvements in lithium hypochlorite in dry form. It is particularly concerned with a new process which is economical to operate and which results in the production of dry lithium hypochlorite compositions of exceptionally satisfactory stability characteristics over relatively long periods of time under the variant conditions conventionally encountered in storage and shipment.

Various processes for the production of dry lithium hypochlorite have been disclosed in prior art patents and other published literature. Nevertheless, despite the fact that a really satisfactory dry lithium hypochlorite composition would have a number of significant advantages over other hypochlorites such as sodium hypochlorite and calcium hypochlorite for use particularly as bleaches or in bleaching compositions, no appreciable commercial marketing of dry lithium hypochlorite as a bleaching agent has occurred. So far as can be ascertained, this has been due, in the main, to one or more factors including the inadequate stability of dry lithium hypochlorite as heretofore produced and the relatively high process costs involved.

In accordance with the present invention, dry lithium hypochlorite compositions are produced which have extremely satisfactory stability characteristics. Moreover, the process by which such compositions are produced is most economical and, thus, commercially very desirable.

In accordance with the invention, the starting material is an aqueous lithium sulfate solution containing essentially lithium sulfate, sodium sulfate, and potassium sulfate. Such solutions are especially desirably derived from processing operations involving the production of lithium sulfate by a procedure which includes, preliminary, decrepitating spodumene, roasting the decrepitated spodumene with sulfuric acid or under such conditions as to convert the lithum values to lithium sulfate, leaching out the lithium sulfate with water, neutralizing excess acid in the resulting solution with limestone or the like generally to a pH of about 6, filtering, purifying by removal of calcium and magnesium, and concentration of the filtrate by evaporation of water therefrom. Such resulting aqueous solutions may contain as low as about 120 and as high as about 270 grams of lithium sulfate per liter; as low as about 10 and as high as about 150 grams of sodium sulfate per liter; and as low as 0 and as high as about 60 grams, and usually from 10 to 15 or from 15 to 35 grams, of potassium sulfate per liter. For use in the practice of the present invention, it is particularly preferred that the starting solutions contain from about 200 to 240, and especially from 210 to 230 grams of lithium sulfate per liter, and from 70 to 110, and especially from 80 to 100, grams per liter of sodium sulfate.

In the practice of the present invention, the aforesaid starting solution is first admixed with aqueous sodium hydroxide in approximately stoichiometric quantity to react with the lithium sulfate in the starting solution to convert it to lithium hydroxide and thereby form additional sodium sulfate, in accordance with the following equation:

$$Li_2SO_4 + 2NaOH \rightarrow 2LiOH + Na_2SO_4$$

While any dilution of aqueous sodium hydroxide can be used in this step, it is desired, for reasons of economy and for reductions in volume of liquids to be handled, to employ strong aqueous solutions of sodium hydroxide, advantageously aqueous solutions containing from about 40 to 50% of sodium hydroxide. The addition of the aqueous sodium hydroxide to the starting solution results in the formation of a slurry or solution in which the concentration of sodium sulfate is very substantially increased.

In order to remove excessive amounts of sodium sulfate from the aforementioned slurry or solution, the latter is cooled down to a low temperature. Before doing so, however, it is desirable in certain cases, dependent on the composition of the starting solution, to dilute said slurry or solution by the addition of water thereto, in sufficient quantity so that the mixture when cooled down to a low temperature, advantageously to about 32 degrees F., or somewhat above or below said temperature, for instance, 30 to 35 degrees F., in a crystallizer, results in the optimum quantity of Glauber's salt $$(Na_2SO_4 \cdot 10H_2O)$$

being crystallized out. The mass is filtered and the filter cake is washed with water and the water washings are added to the filtrate. The washed Glauber's salt may, if desired, be purified and represents a salable byproduct.

The recovered solution, comprising the filtrate and water washings, now contains essentially lithium hydroxide, sodium sulfate and potassium sulfate. As illustrative of the composition of said recovered solution, in relation to a particular starting solution and the slurry after the addition of the aqueous sodium hydroxide to said starting solution, the following table is presented:

|  | Starting Solution | Starting Solution Plus Sodium Hydroxide | Recovered Solution |
| --- | --- | --- | --- |
| $Li_2SO_4$ (grams/liter) | 230 |  |  |
| LiOH (grams/liter) |  | 82 | 100 |
| $Na_2SO_4$ (grams/liter) | 85 | 314 | 100 |
| $K_2SO_4$ (grams/liter) | 20 | 16 | 20 |

To the recovered solution, there is then added, in at least a stoichiometric proportion, aqueous sodium hydroxide and a stoichiometric proportion of chlorine, to convert the lithium hydroxide to lithium hypochlorite in accordance with the following equation:

$$LiOH + NaOH + Cl_2 \rightarrow LiOCl + NaCl + H_2O$$

As in connection with an earlier step in the process, it is desirable to use strong aqueous solutions of sodium hydroxide, advantageously aqueous solutions containing about 40 to 50% sodium hydroxide. It is desirable to utilize a slight excess of sodium hydroxide over stoichiometric proportions in the formation of the lithium hypochlorite from the lihtium hydroxide in order to enhance the stability of the lithium hypochlorite. This slight excess of sodium hydroxide, which is desirably of the order of ¼ to ¾%, generally about ½%, serves to inhibit loss of available chlorine from the lithium hypochlorite in the lithium hypochlorite solution prior to the spray drying step, hereafter described, as well as subsequently during storage and shipping of the dry lithium hypochlorite compositions of the present invention. It is particularly advantageous to utilize such slight excess of sodium hydroxide if the final solution is allowed or required to stand for any appreciable period of time before it is spray dried. Instead of using a slight excess of sodium hydroxide, a small amount of lithium hydroxide can be added to provide that excess, in terms of alkalinity, to bring about the enhancement of the stability of the lithium hypochlorite.

The lithium hypochlorite-containing solution is now ready for spray drying. In a typical illustration of the nature of such solution, but by no means limitative thereof, it will contain about 12% lithium hypochlorite, about 12 to 13% sodium chloride, about 4 to 5% sodium sulfate, about 0.7 to 0.8% potassium sulfate, very slight amounts of lithium hydroxide or sodium hydroxide, and the balance, of the order of about 70%, water.

Various types of spray driers can be used but it is particularly desirable to utilize the so-called parallel flow spray drier. The lithium hypochlorite-containing solution is advantageously fed into the spray drier at about room temperature. The inlet air temperature should be between about 380 to 420 degrees F. and the outlet air temperature should be between about 200 and 240 degrees F. Air inlet temperatures should not, generally speaking, exceed 420 degrees F. since, to do so, results in losses of available chlorine and reduction in content of available chlorine in the finished dry composition. Air inlet temperatures below 380 degrees F. tend to produce spray dried compositions with unduly high moisture contents with resultant inferior product stability. Analogous advantages result if the outlet air temperature exceeds about 240 degrees F., or if the outlet air temperature is below about 200 degrees F. The spray dried composition should have a moisture content which does not exceed 7% and, more advantageously, the moisture content should fall within the range of 3 to 7%, with 4 to 5% being particularly satisfactory.

For insuring the obtaining of a spray dried composition having minimum losses in available chlorine, it is highly advantageous to reduce the temperature of the spray dried composition as promptly as possible to below about 120 degrees F. This can be done in a variety of ways one of which is to effect a primary separation, in a cyclone, of the spray-dried composition from the drying air, recovering approximately 90% of the spray-dried composition, the latter being conveyed by chilled air, which cools it to a temperature below 120 degrees F., while in transit, to a secondary cyclone.

While, as pointed out above, the spray drying operation should be carried out under the conditions described, dry compositions having fair stability and a fairly high content of available chlorine, with not overly high losses of available chlorine during the production of the finished dry compositions, can be produced under spray drying conditions in which higher drying temperatures are utilized provided that the drying time is very short. These latter procedures, however, are not nearly as satisfactory as those which have been described above previously.

The following example is illustrative of the practice of the present invention. It will be understood that various changes may be made therein without departing from the fundamental teachings and guiding principles disclosed herein, and as more particularly pointed out and delineated in the appended claims. All parts given are by weight.

*Example*

320 parts of a 50 wt.-percent aqueous sodium hydroxide solution was added to 1200 parts of an aqueous lithium sulfate solution taken from a process stream, said 1200 parts of solution containing 220 parts of $Li_2SO_4$, 95 parts of $Na_2SO_4$, 20 parts of $K_2SO_4$, and 865 parts of water. The mixture was diluted with 220 parts of water, and then cooled to 32 degrees F., resulting in the crystallization of Glauber's salt ($Na_2SO_4 \cdot 10H_2O$), which was removed by filtration. Then 310 parts of 50 wt.-percent aqueous sodium hydroxide solution was added to the filtrate, followed by chlorination with 275 parts of gaseous chlorine. The chlorinated solution was spray dried in a spray dryer, using inlet and outlet temperatures of 400 degrees F. and 220 degrees F., respectively, and the spray dried composition was rapidly cooled to below 120 degrees F. The resulting dried composition showed, on analysis, 5% moisture and 40% available chlorine.

Illustrative of particularly satisfactory dry lithium hypochlorite compositions produced in accordance with the present invention are those containing approximately 35 to 40% available chlorine and having the following approximate composition:

| | Percent |
|---|---|
| LiOCl | 32 |
| NaCl | 34 |
| $Na_2SO_4$, $K_2SO_4$ | 20 |
| LiCl | 2 |
| $LiClO_3$ | 2 |
| LiOH (or NaOH) | 2 |
| $Li_2CO_3$ | 1 |
| $H_2O$ | Balance |

The composition is in the form of a white powder.

The present invention makes possible the production of dry lithium hypochlorite compisitions in which good yields of active lithium hypochlorite are obtained and in which the dry compositions have excellent stability. This is achieved because of a combination of factors which include the nature and composition of the starting solution, the chemical processing steps, and the conditions under which the spray drying is effected, these factors being interrelated so far as the obtaining of the desired final dry compositions are concerned. In this general connection, for instance, it will be noted that high stability of the lithium hypochlorite is obtained despite the fact that there is a very high content of sodium present, as sodium chloride and sodium sulfate, which might have been expected to, but does not, cause inversion of the lithium hypochlorite to unstable sodium hypochlorite.

The dry lithium hypochlorite compositions produced in accordance with the present invention are in the form of white particles whose average particle size varies but which, in typical instances, will lie in the range of 60 to 80 microns and whose bulk density will commonly lie in the range of 38 to 40 pounds per cubic foot. They may be admixed with surfactants, such as benzene-, toluene-, xylene-, dodecyl-, tridecyl-, tetradecyl and pentadecyl benzene sodium sulfonates, and said surfactants, which may be utilized in varying amounts, generally up to about 1.5 to 2% by weight of the dry lithium hypochlorite compositions, may be added before or after the spray drying step. In general, those compositions which contain surfactants will tend to have somewhat greater average particle sizes and lesser bulk densities than the corresponding compositions without the surfactants. The lithium hypochlorite compositions, either with or without surfactants, can be compacted, if desired, to provide granules of particular character and bulk densities for convenience in handling and packaging.

The dry lithium hypochlorite compositions made in accordance with this invention have shown excellent bleaching properties when used for bleaching cotton and other fabrics and with about the same results as to fiber strength and on various types of dyes as sodium hypochlorite. They are compatible with various substances such as sodium sulfate, sodium phosphates and polyphosphates, abrasives, sodium silicates, optical brighteners, and the like. They may, thus, be diluted therewith or with various diluents to produce products, for home laundry use, scouring powders, and the like, containing, say, from 4 to 8% available chlorine or less. In general, the lithium hypochlorite dry compositions of the present invention should be kept in closed containers to avoid undue deterioration. For bulk shipping, it is desirable to use fiber drums with polyethylene liners.

What we claim as new and desire to protect by Letters Patent of the United States is:

1. A process for preparing lithium hypochlorite compositions in dry form which comprises providing an aqueous solution consisting essentially of from 120 to 270 grams per liter of lithium sulfate, from 10 to 150 grams per liter of sodium sulfate and from 0 to 60 grams per liter of potassium sulfate, admixing therewith an aqueous solution of sodium hydroxide in approximately stoichiometric quantity to react with the lithium sulfate in said first-mentioned solution to convert it to lithium hydroxide and thereby to form additional sodium sulfate, lowering the temperature of said mixture to crystallize out a substantial proportion of the sodium sulfate present, removing said crystallized sodium sulfate, adding at least a stoichiometric proportion of an aqueous solution of sodium hydroxide to the filtrate and a substantially stoichiometric amount of chlorine whereby to form a hypochlorite solution, and spray drying the resulting solution to produce a spray dried lithium hypochlorite composition, said spray drying operation being conducted under an inlet air temperature between 380 and 420 degrees F., and an outlet air temperature between 200 and 240 degrees F.

2. A process for preparing lithium hypochlorite compositions in dry form which comprises providing an aqueous solution consisting essentially of from 200 to 240 grams per liter of lithium sulfate, from 70 to 110 grams per liter of sodium sulfate and from 10 to 50 grams per liter of potassium sulfate, admixing therewith a 40 to 50% aqueous solution of sodium hydroxide in approximately stoichiometric quantity to react with the lithium sulfate in said first solution to convert it to lithium hydroxide and thereby to form additional sodium sulfate, diluting said mixture with water, lowering the temperature of the resulting mixture to crystallize out, as Glauber's salt, substantial quantities of the sodium sulfate present in said mixture, filtering to remove said crystallized Glauber's salt, washing said filter cake with water and adding said washings to the filtrate, adding the stoichiometric amount of approximately 40 to 50% aqueous sodium hydroxide to the filtrate and washings equivalent to the lithium hydroxide contained therein, followed by the addition of a slight excess of at least one alkali selected from the group consisting of lithium hydroxide and sodium hydroxide solutions, and adding a stoichiometrically equivalent amount of chlorine whereby to form a hypochlorite solution, and spray drying the resulting solution to produce a spray dried lithium hypochlorite composition containing from 3 to 7% moisture, said spray drying operation being conducted under an inlet air temperature between 380 and 420 degrees F., and an outlet air temperature between 200 and 240 degrees F., and rapidly reducing the temperature of the spray dried composition to below 120 degrees F.

3. A process for preparing lithium hypochlorite compositions in dry form which comprises providing an aqueous solution consisting essentially of 210 to 230 grams per liter of lithium sulfate, 80 to 100 grams per liter of sodium and 15 to 35 grams per liter of potassium sulfate, admixing therewith an approximately stoichiometric quantity of 40 to 50% aqueous sodium hydroxide to react with the lithium sulfate in said first-mentioned solution to convert it to lithium hydroxide and thereby to form additional sodium sulfate, diluting the mixture with water, lowering the temperature of the resulting mixture to about 32 degrees F. to crystallize out substantial quantities of the sodium sulfate present in said mixture, filtering to remove said crystallized sodium sulfate, washing said filter cake with water and adding said washings to the filtrate, adding the stoichiometric amount of approximately 40 to 50% aqueous sodium hydroxide to the filtrate and washings equivalent to the lithium hydroxide contained therein, followed by the addition of a slight excess of at least one alkali selected from the group consisting of lithium hydroxide and sodium hydroxide solutions, and adding a stoichiometrically equivalent amount of chlorine whereby to form a hypochlorite solution, and spray drying the resulting solution to produce a spray dried lithium hypochlorite composition containing from 3 to 7% moisture, said spray drying operation being conducted under an inlet air temperature of about 420 degrees F., and an outlet air temperature of about 200 degrees F., and rapidly reducing the temperature of the spray dried composition to below 120 degrees F.

4. A dry lithium hypochlorite composition made in accordance with claim 3, said composition containing about 35 to 40% available chlorine and having the following approximate composition:

| | Percent |
|---|---|
| LiOCl | 32 |
| NaCl | 34 |
| $Na_2SO_4$, $K_2SO_4$ | 20 |
| LiCl | 2 |
| $LiClO_3$ | 2 |
| At least one material selected from the group consisting of LiOH and NaOH | 2 |
| $Li_2CO_3$ | 1 |
| $H_2O$ | Balance |

References Cited by the Examiner

UNITED STATES PATENTS

| 2,356,820 | 8/44 | Cady | 23—86 |
| 2,901,435 | 8/59 | Robson | 252—187 |
| 3,000,699 | 9/61 | Gauguin et al. | 23—32 |
| 3,017,243 | 1/62 | Archambault et al. | 23—32 |

FOREIGN PATENTS 841,989   7/60   Great Britain.

OTHER REFERENCES

September 1961, "LCA Product Information," Lithium Corp. of America, Inc., "Data Sheet."

JULIUS GREENWALD, *Primary Examiner.*

ALBERT T. MEYERS, *Examiner.*